US008521796B2

(12) United States Patent
Hou

(10) Patent No.: US 8,521,796 B2
(45) Date of Patent: Aug. 27, 2013

(54) SETTING CORDIC ITERATION COUNTS

(75) Inventor: Jianhui Hou, Xi'an (CN)

(73) Assignee: Infineon Technologies AG, Neubiberg (DE)

( * ) Notice: Subject to any disclaimer, the term of this patent is extended or adjusted under 35 U.S.C. 154(b) by 1211 days.

(21) Appl. No.: 12/277,388

(22) Filed: Nov. 25, 2008

(65) Prior Publication Data

US 2010/0131579 A1    May 27, 2010

(51) Int. Cl.
*G06F 1/00*        (2006.01)
*G06F 7/38*        (2006.01)

(52) U.S. Cl.
USPC .......................................... 708/270; 708/442

(58) Field of Classification Search
USPC ..................................... 708/270, 442
See application file for complete search history.

(56) References Cited

U.S. PATENT DOCUMENTS 7,298,296 B1 * 11/2007 Kamath ........................ 341/61

* cited by examiner

*Primary Examiner* — Tan V. Mai
(74) *Attorney, Agent, or Firm* — SpryIP, LLC

(57) ABSTRACT

This disclosure relates to setting the iteration count of a Cordic module as a function of a signal characteristic of an input signal provided to the Cordic module.

20 Claims, 6 Drawing Sheets

SETTING CORDIC ITERATION COUNTS

BACKGROUND

CORDIC (Coordinate Rotation Digital Computer) is a simple and efficient algorithm to calculate hyperbolic and trigonometric functions, and can be implemented by software, using an ASIC or with a DSP. An increasing number of applications (for example, Bluetooth, WiMAX, DTV, etc.) are using Cordic algorithms to realize functions that are used with applications such as frequency mixers, Fast Fourier Transform, demodulators, and phase discriminations.

In all of these applications, an important parameter which should be incorporated into the design is the Cordic iteration counts. Setting the optimal iteration counts for the Cordic requires a trade-off between performance, chip area and power consumption. The best performance is obtained with higher iteration counts and provides a better calculation accuracy of the Cordic itself, but the chip's area and power consumption also will be drastically increased. On the other hand, low iteration counts result in poor Cordic accuracy and performance but the chip area needed to meet the Cordics low performance requirements is much smaller.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
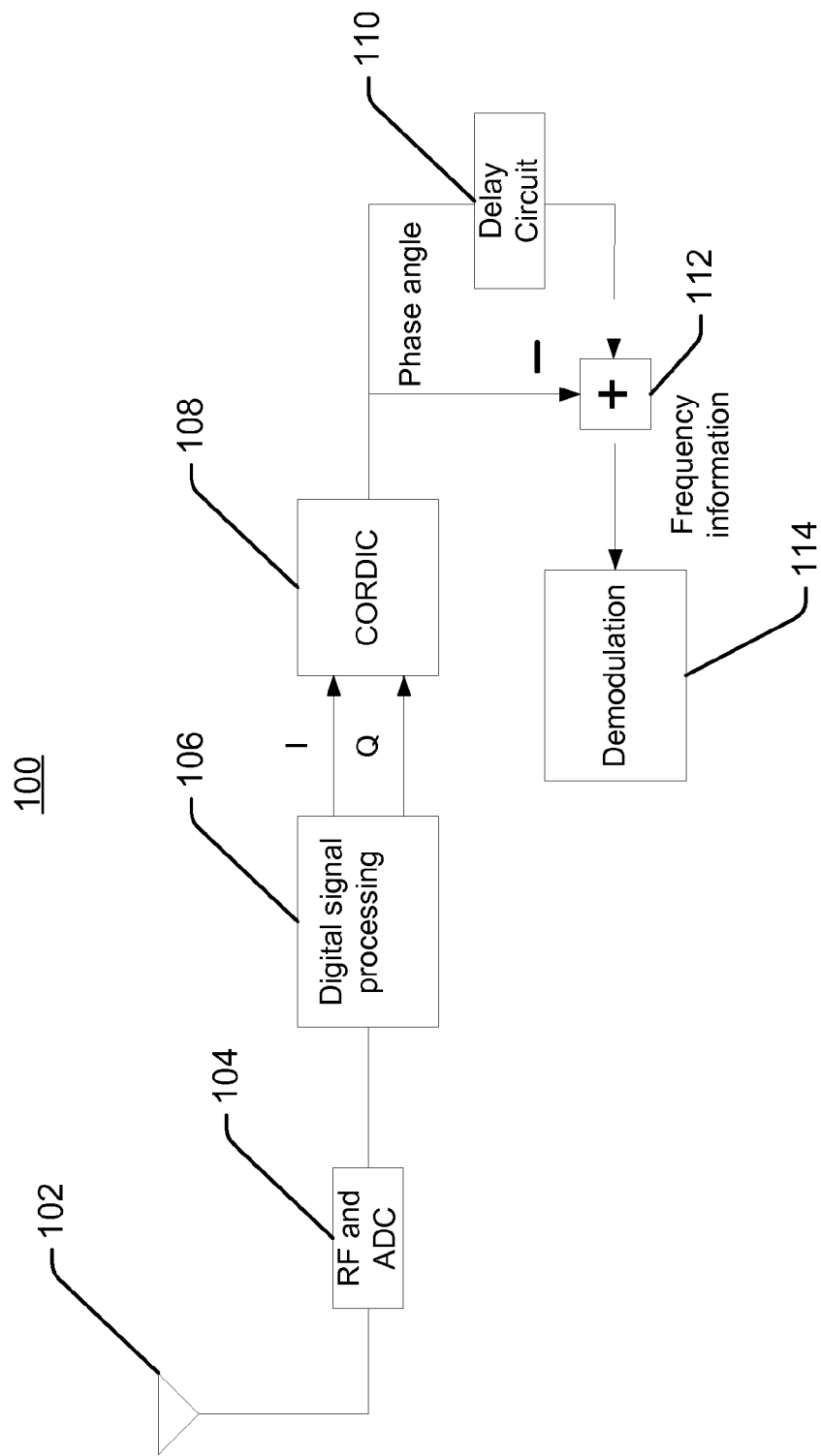
FIG. 1 is a simplified schematic diagram of a system for demodulating a signal using an exemplary Cordic.

FIG. 1 illustrates an exemplary system 100 for demodulating a signal that uses a Cordic (also referred to herein as a "Cordic Circuit" or a "Cordic Module"). System 100 includes an antenna 102 coupled to an RF down converter and Analog to Digital converter 104. Converter 104 is coupled via Digital Signal Processing (DSP) circuit 106 to Cordic module 108. The output of Cordic module 108 is coupled via Delay circuit 110 and adder circuit 112 to Demodulation circuit 114.

Antenna 102 receives an RF signal and supplies the received RF signal to converter 104 that down converts the received RF signal and feeds it to DSP circuit 106. DSP 106 circuit then processes the signal to remove the information to be demodulated and supplies the processed signal to Cordic module 108. The Cordic module 108, using a fixed iteration count, computes a phase angle. The phase angle is supplied in a signal to delay circuit 110 and adder circuit 112 to compute frequency information. Such frequency information is then supplied to demodulation circuit 114.

Disclosed herein are techniques for setting an iteration count of a Cordic module or circuit. In many applications, the SNR of a Cordic module's input signal varies within a large range (5-50 dB). Depending on which end of the SNR spectrum the device is operating in, the dominant noise source will differ.

While SNR is high, the Cordic's calculation error will be the main noise source. So, in order to increase the system performance, the iteration counts of the Cordic needs to be increased to get better calculation accuracy.

While SNR is low, the system noise (e.g. gauss white noise) is the main noise source. So, only low iteration counts need to be used to guarantee the same performance as when the iteration count is set high.

Thus, by using a fixed iteration count that does not take into account system noise, from a system level view, the system (or device) may suffer from not only the calculation error of a Cordic, but also from the system noise (e.g. gauss white noise and so on). As a result, the traditional scheme will be over-constrained.

In one described implementation, the signal to noise ratio (SNR) of an input signal to the Cordic module is detected with a detection circuit. The signal corresponding to the amplitude of the detected SNR is fed to a control circuit that generates an iteration count signal based on the amplitude of the detected SNR. The iteration count signal is then fed to a Cordic module to set its iteration count in accordance with the iteration count signal. Thus the iteration count of the Cordic module is dynamically set such that it decreases with a decrease in the SNR and increases with an increase in the SNR of the input signal.

According to another implementation, a method is provided for dynamically setting the iteration count of a Cordic module as a function of the SNR of the input signal of the module.

Although the implementation is described as setting the iteration count of the Cordic as a function of the SNR, other input signal characteristics could be used to set the iteration count such as the RSSI (Receive Signal Strength Indicator) or the CNO (carrier to noise ratio) which can be used to indicate the strength of the received input signals.

The techniques described herein may be implemented in a number of ways. One example environment and context is provided below with reference to the included figures and ongoing discussion.

Exemplary Systems

Figure 2:
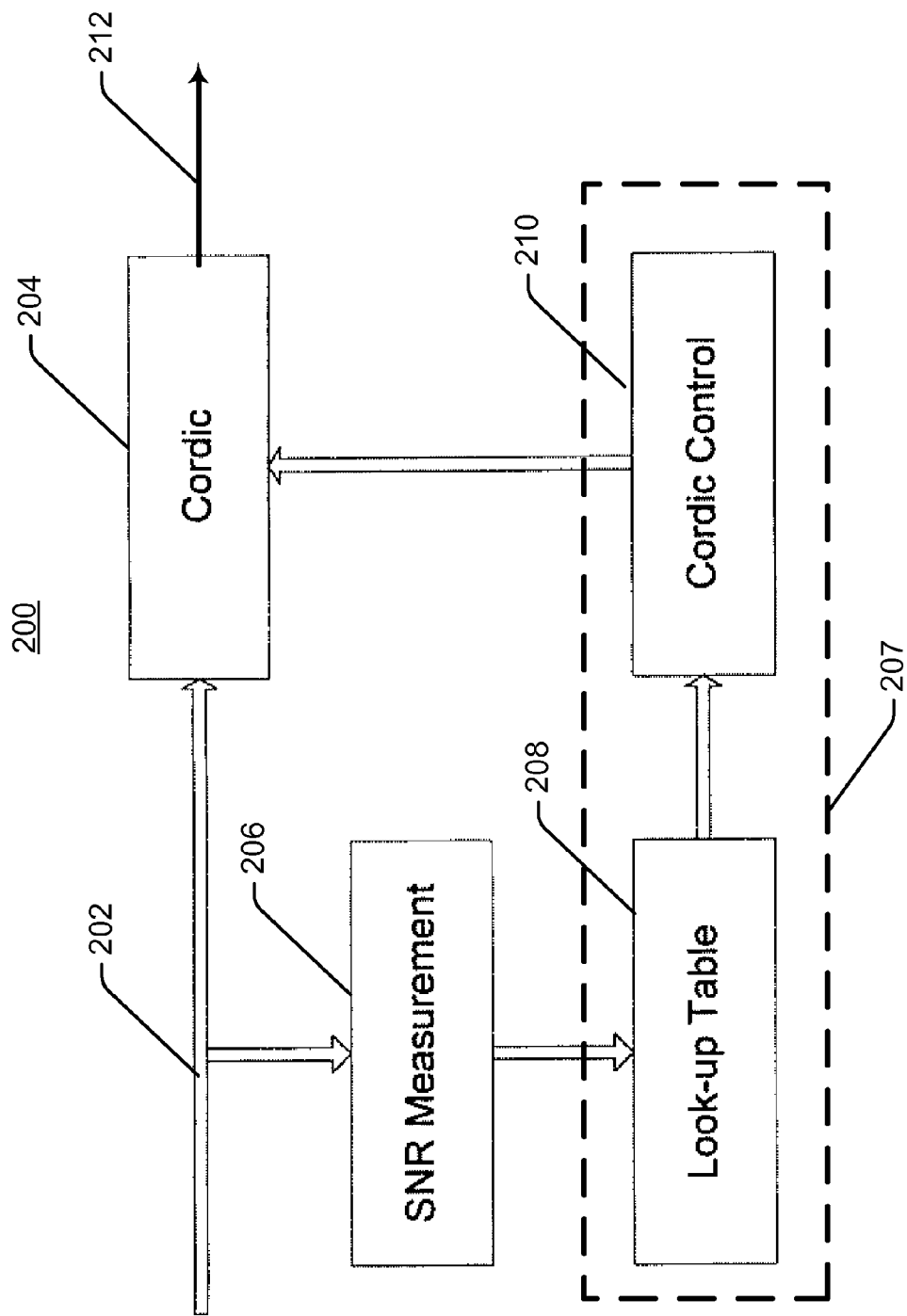
FIG. 2 is a simplified schematic diagram of a system for setting Cordic iterations times.

FIG. 2 illustrates one implementation of a Cordic system 200 to transform an input signal on line 202 into a Cordic function. System 200 includes input line 202 connected to SNR measurement circuit 206. SNR measurement circuit 206 is coupled to control circuit 207. Control circuit 207 includes a look-up table 208 that is connected to Cordic control 210. In one implementation, the Cordic circuit 204 may be a serial Cordic or, in another implementation, the Cordic circuit may be a parallel Cordic circuit. Further details of implementations using a serial and a parallel Cordic module are described herein in FIGS. 5 and 6. Cordic Control 210 is connected to Cordic circuit 204. The output of Cordic circuit 204 is connected to line 212.

During operation of system 200, an input signal on line 202 is fed to Cordic circuit 204 and is detected by SNR measurement circuit 206. The SNR measurement circuit 206 receives the input signal on line 202 and automatically calculates the SNR. The SNR measurement circuit 206 feeds a level or digital signal corresponding to the magnitude of the SNR of the input signal to lookup table 208 in control circuit 207. This table 208 contains entries that relate iteration counts to corresponding SNR measurement information for Cordic circuit 204. Table 208 can be stored in any computer readable medium, such as a ROM with the pre-calculated iteration count value. Table 208 can also be stored in an SRAM or in registers that can be configured by the other devices (such as, for example, the firmware of a host computer).

The magnitude of the SNR of the input signal is converted to an iteration count signal in lookup table 208. The iteration count signal is generated using lookup table 208 and indicates a number N corresponding to an iteration count. The iteration count is obtained by retrieving an entry in the look-up table corresponding to the magnitude of the SNR of the input signal. The iteration count signal is fed to Cordic control 210 in control circuit 207. Cordic Control 210 in control circuit 207 feeds the iteration signal to Cordic circuit 204 to dynamically adjust its iteration counts. Cordic control 210 adjusts the iteration counts (e.g. reduces the clock frequency or clock gating)for the serial Cordic circuit to realize the tradeoff between the power consumption and performance of the Cordic circuit 204. Cordic circuit 204 generates a Cordic output signal on line 212 in accordance with the adjusted iteration count.

Although the Cordic system 200 includes control circuit 207 with a look-up table 208, the Cordic system as shown is just one example implementation. Further this implementation is meant to serve only as a non-limiting example and other circuits or modules can be used to accomplish similar functionality.

Exemplary Process

Specifics of exemplary methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

Figure 3:
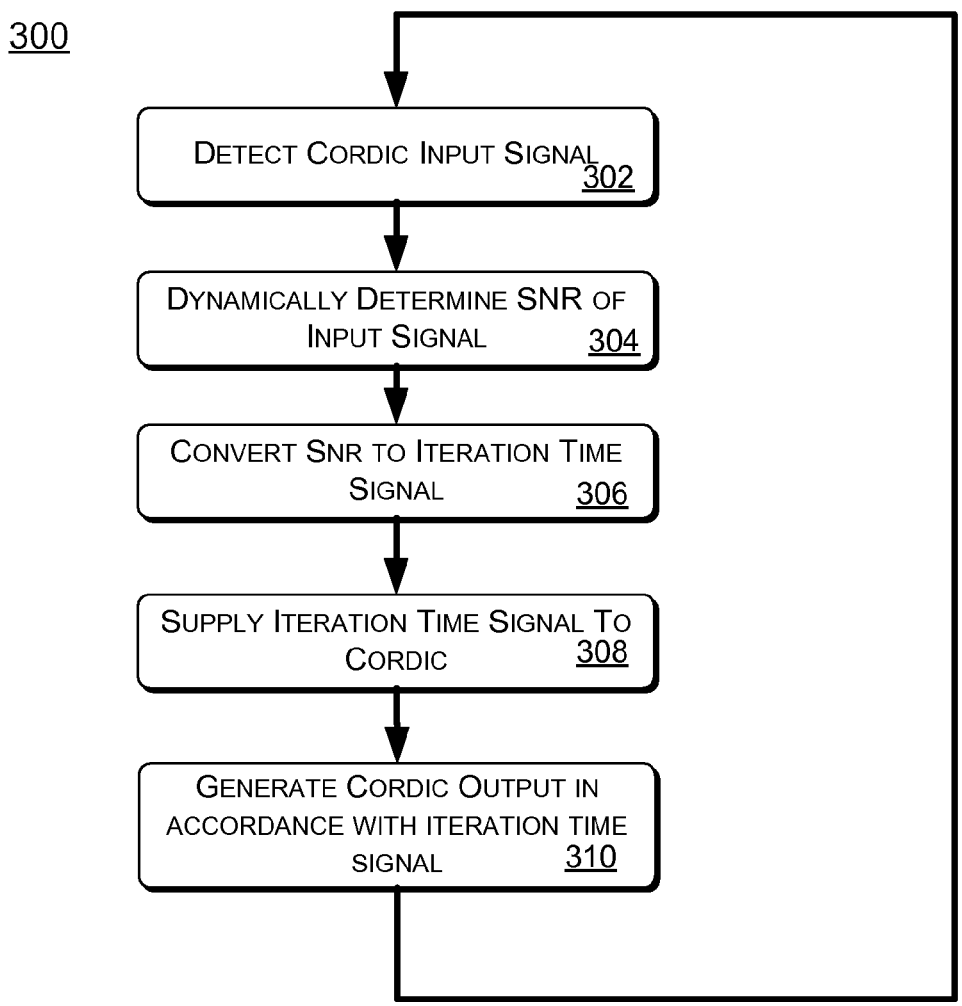
FIG. 3 is a flow diagram of a process for setting the Cordic iteration count.

FIG. 3 shows one example implementation of a process 300 for setting the Cordic iteration count of Cordic module 204 using the system 200 shown in FIG. 2. In block 302, an input signal on line 202 is fed to Cordic circuit 204 and is detected by SNR measurement circuit 206. In block 304, the SNR measurement circuit 206 receives the input signal on line 202 and automatically calculates the SNR. The SNR measurement circuit 206 feeds a level or digital signal corresponding to the magnitude of the SNR of the input signal to lookup table 208 in control circuit 207.

In block 306, the magnitude of the SNR of the input signal is converted to an iteration count signal in lookup table 208.

In block 308, the iteration count signal is generated using lookup table 208 and indicates a number N corresponding to an iteration count. The iteration count signal is fed to Cordic control 210 in control circuit 207. Cordic Control 210 converts the iteration count signal to an iteration control signal that is fed to Cordic circuit 204 to dynamically adjust Cordic circuit 204 iteration counts.

Cordic circuit 204, in block 310, generates a Cordic output signal on line 212 in accordance with the adjusted iteration count.

Process 300 then repeats in block 302 to block 310 to dynamically adjust the Cordic iteration count. If the SNR increases when process 300 is repeated, a signal indicating a higher iteration count will be fed by control circuit 207 to Cordic 204. If the SNR decreases when process 300 is repeated, a signal indicating a lower iteration count will be provided by control circuit 207 to Cordic circuit 204. Cordic circuit 204 will correspondingly respond to the iteration signal by adjusting its iteration count.

Figure 4:
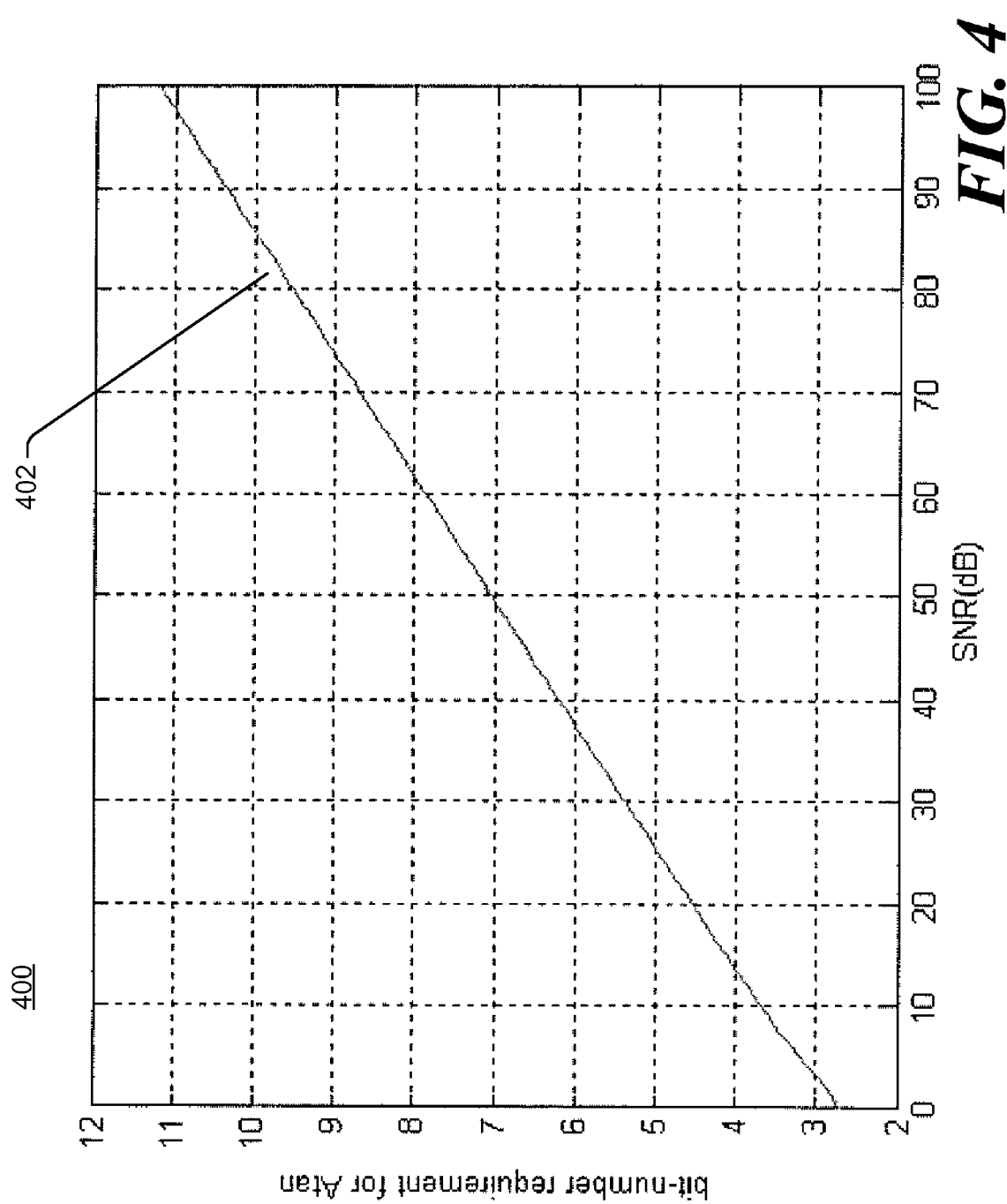
FIG. 4 is a chart illustrating a proposed Cordic iteration count as a function of the SNR of the Cordic's input signal.

In FIG. 4 there is shown a diagram 400 illustrating the proposed Cordic iteration count (Atan) as a function of the SNR of the Cordic's input signal. As can be seen from diagram 400, when the SNR of the input signal is low, the iteration count is also low, and when the SNR is high, the bit-number requirement for the iteration count is high. In one implementation, this diagram corresponds to entries in lookup table 208. Specifically, the entries of the lookup table would be populated with the conversion points between SNR and iteration count along line 402. For example, if the SNR of the input signal was 50 dB, the iteration count entry in the lookup table could be 7.

For illustration purposes only, a description and analysis are provided to determine the iteration count in the content of a detailed Cordic mode, e.g. the vectoring mode Cordic in circular coordinate. This mode is used to calculate the phase and amplitude of an input signal on line 202.

The iteration formulas are given in Eq1-Eq4
The iteration formulas is given in Eq1~Eq4.

$$\begin{cases} x(j+1) = x(j) - \sigma_j 2^{-j} y(j) \\ y(j+1) = y(j) + \sigma_j 2^{-j} x(j) \\ z(j+1) = z(j) - \sigma_j \tan^{-1}(2^{-j}) \end{cases} \quad (Eq1)$$

In which, $$\sigma_j = \begin{cases} 1 & y(j) < 0 \\ -1 & y(j) \geq 0 \end{cases} \quad (Eq2)$$

The initial input data is $$\begin{cases} x(0) = x_{in} \\ y(0) = y_{in} \\ z(0) = 0 \end{cases} \quad (Eq3)$$

The output data after N times iteration is $$\begin{cases} x_f = K(x_{in}^2 + y_{in}^2)^{1/2} \\ y(f) = 0 \\ z(f) = z_{in} + \tan^{-1}\left(\frac{y_{in}}{x_{in}}\right) \end{cases} \quad (Eq4)$$

Here is the calculation error "E(N)" for N times iteration:

$$2^{-N} < E(N) < 2^{-(N-1)} \quad (Eq5)$$

To aid in understanding the principles of the disclosed embodiment, assume that SNR is the signal to noise ratio at input position:

$$SNR = Psig/Pnoise \quad (Eq6)$$

Where, Psig is the energy of the signal, and Pnoise is the energy of the noise.

In the vectoring mode of the Cordic circuit 204, the Cordic circuit is used to calculate the phase angle of input signal with energy, Psig. Assuming that the variance of phase calculation error induced by Pnoise is X, the variance of phase calculation error induced by the Cordic circuit 204 is Y. According to Eq5, the error induced by the Cordic circuit 204 is a uniform distribution of noise (the range is ($2^{-N}$, $2^{-(N-1)}$)), the variance is:

$$Y=2^{(-2*N)}/12 \tag{Eq7}$$

In order to evaluate the relation between the SNR and iteration counts N, a value X needs to be determined with different SNR using float-point simulation, and then the corresponding N needs to be calculated to make X=Y. When N is calculated, it is plotted on FIG. 4 as line 402 to provide the optimum relationship between the iteration count and SNR.

Other Exemplary Systems

Figure 5:
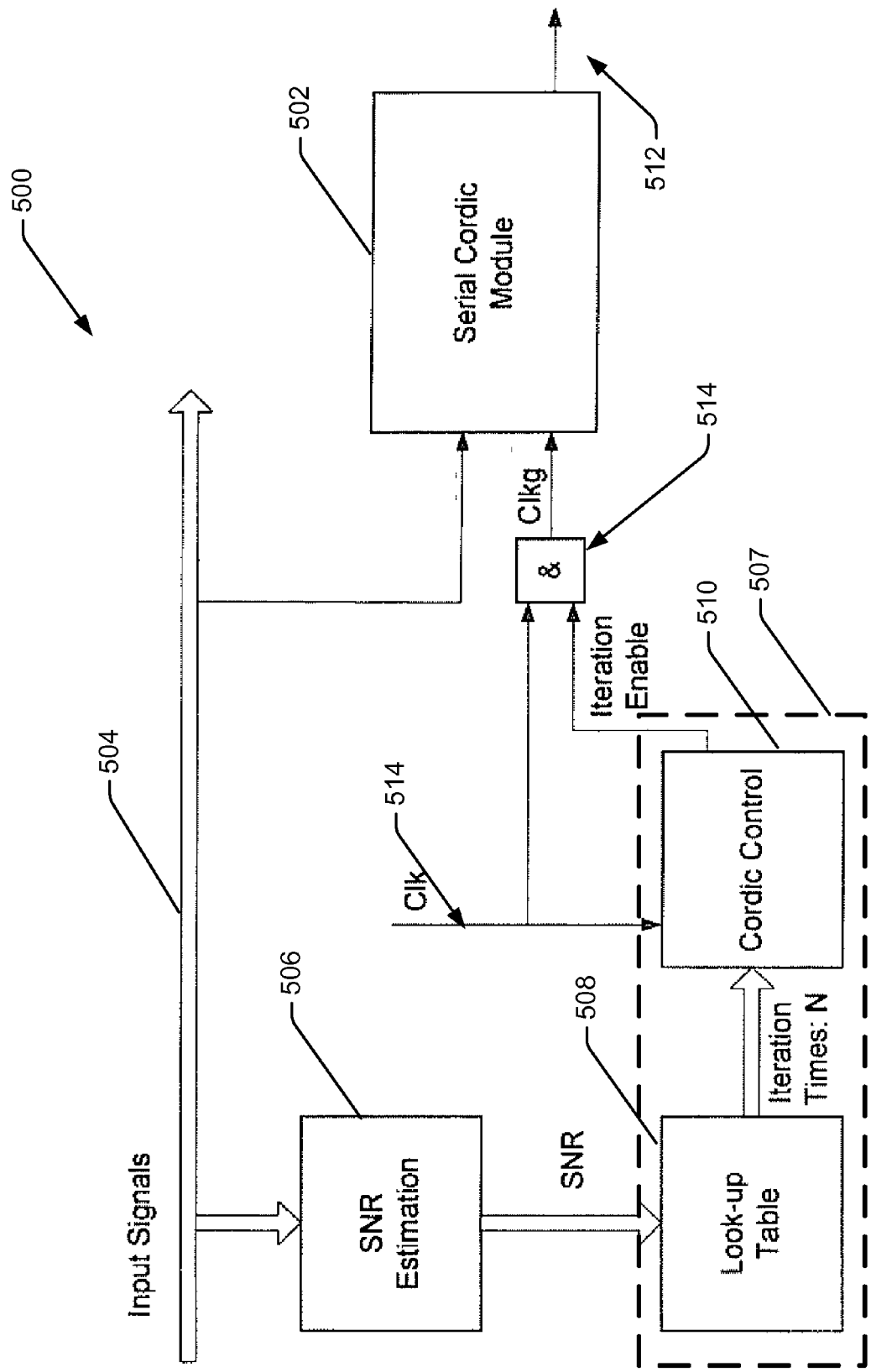
FIG. 5 is a simplified schematic diagram of a system for setting Cordic iteration counts using a serial Cordic circuit.

FIG. 5 illustrates a simplified schematic diagram of a system 500 for setting Cordic iteration counts using a serial Cordic module 502. System 500 includes input lines 504 coupled to an SNR estimation circuit 506 and serial Cordic module 502. SNR estimation Circuit 506 is coupled to a look-up table 508 in control circuit 507. Control circuit 507 includes a look-up table 508 connected to serial Cordic control circuit 510.

During operation of system 500, an input signal on line 504 is fed to serial Cordic module 502 and is detected by SNR estimation circuit 506. The SNR estimation circuit 506 receives the input signal on line 504 and automatically calculates the SNR. The SNR estimation circuit 506 feeds a level or digital signal corresponding to the magnitude of the SNR of the input signal to lookup table 508 in control circuit 507. This table 508 contains entries that relate iteration counts to corresponding SNR measurement information for Cordic circuit 504.

The magnitude of the SNR of the input signal is converted to an iteration count signal in lookup table 508. The iteration count signal is generated using lookup table 508 and indicates a number N corresponding to an iteration count. The iteration count signal is fed to Cordic control 510 in control circuit 507. The Cordic control circuit 510 includes a counter and is coupled to Cordic circuit 502 via And-gate 514. A clock signal is provided on line 514 to Cordic control circuit 510 and And-gate 514. The counter can generate an enable pulse with a period of N clocks width to gate the clock provided on line 514 and therefore, to control the iteration counts of the Cordic module 502. Cordic Control 510 in control circuit 507 feeds the clock enable pulse with N clocks width to the And-gate 514 to control the clock of serial Cordic module 502. And-gate 514 generates a gated clock for the serial Cordic module 502. Serial Cordic module 502 is fed a signal from control circuit 507 via And-gate 514 to dynamically adjust the iteration counts of Cordic module 502. The clock enable pulse can gate the clock signal provided on line 514 to control the iteration counts of Cordic module 502. Cordic circuit 502 generates a Cordic output signal on line 512 in accordance with the adjusted iteration count.

The iteration counts of serial implementation are controlled by the running clock number. For example, after resetting the serial Cordic module 502, the Cordic module 502 will iterate N times with N clock periods. The iteration counts can be controlled by a clock-gating cell in serial Cordic module 502.

Figure 6:
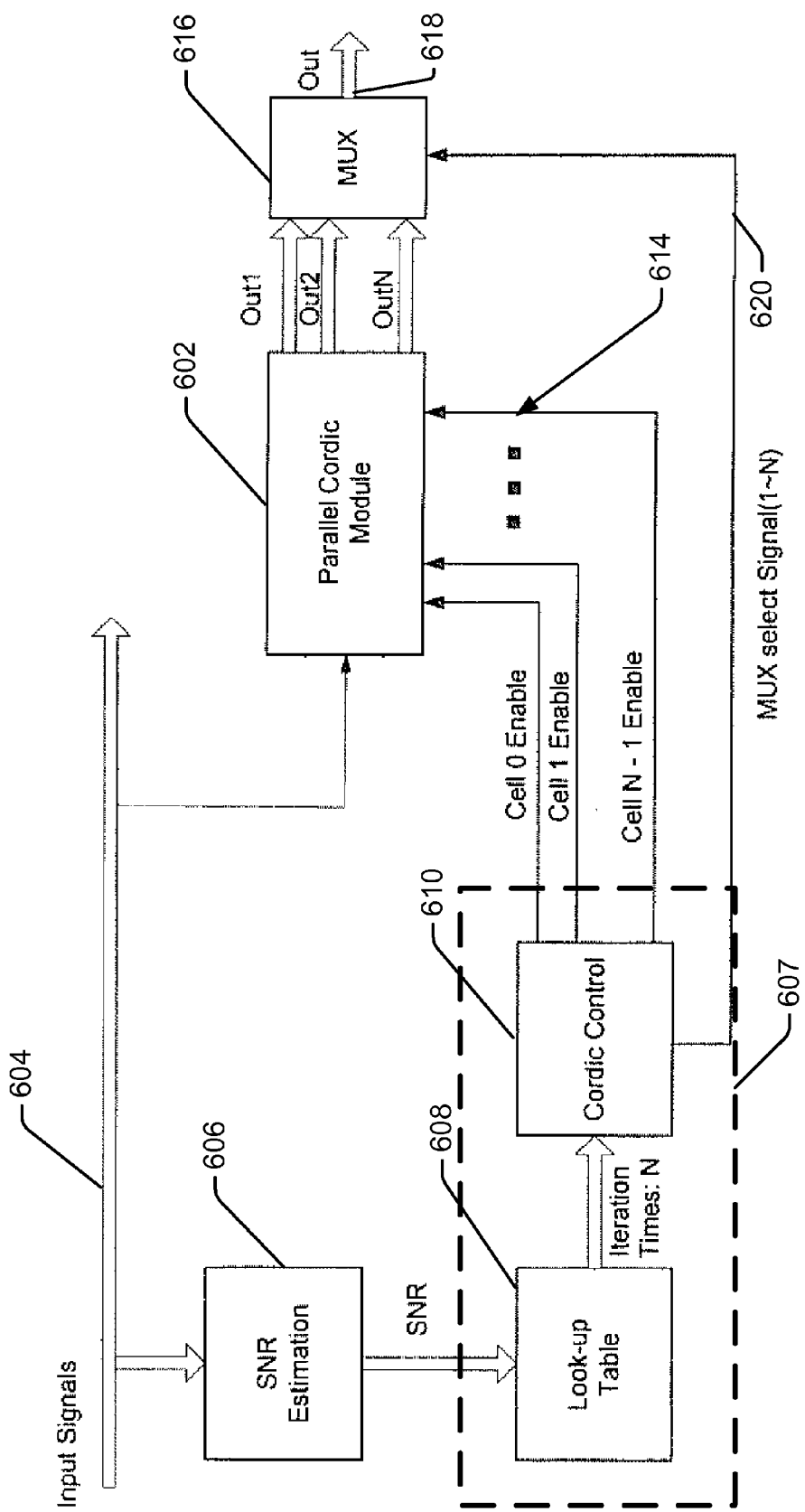
FIG. 6 is a simplified schematic diagram of a system for setting Cordic iteration counts using a parallel Cordic circuit.

FIG. 6 illustrates a simplified schematic diagram of a system 600 for setting Cordic iteration counts using a parallel Cordic circuit or module 602. System 600 includes input lines 604 coupled to an SNR estimation circuit 606 and a parallel Cordic module 602. SNR estimation circuit 606 is coupled via look-up table 608 in control circuit 607. Control circuit 607 includes a look-up table 608 connected to parallel Cordic control circuit 610. The Cordic control circuit 610 is connected to Cordic circuit 602 via lines 614. The parallel Cordic module 602 has outputs connected to multiplexer 616. The outputs of multiplexer 616 are lines 618. Cordic Control 610 is connected to multiplexer 616 via lines 620 and feeds Mux select signals on lines 620.

During operation of system 600, an input signal on line 604 is fed to Parallel Cordic module 602 and is detected by SNR estimation circuit 606. The SNR estimation circuit 606 receives the input signal on line 604 and automatically calculates the SNR. The SNR estimation circuit 606 feeds a level or digital signal corresponding to the magnitude of the SNR of the input signal to lookup table 608 in control circuit 607. This table 608 contains entries that relate iteration counts to corresponding SNR measurement information for Cordic circuit 604.

The magnitude of the SNR of the input signal is converted to an iteration count signal in lookup table 608. The iteration count signal is generated using lookup table 608 and indicates a number N corresponding to an iteration count. The iteration count signal is fed to Cordic control 610 in control circuit 607. Cordic circuit 602 generates Cordic output signals on line 616 in accordance with the adjusted iteration count. The output signals are then fed output via multiplexer 616 to output line 618.

Parallel Cordic module 602 consists of N similar Cordic cells (not shown). The Cordic control module 610 generates several iteration or enable signals on lines 614 for different Cordic cells in parallel Cordic module 602. In one implementation, the output of one of the cells represents the result of 3 Cordic iterations. Thus, the iteration counts of Cordic module 602 can be controlled by generating different enable signals on lines 614 and multiplexer selection signals on lines 620 for different iteration counts. For example, if the iteration count needs to be set to 3, only 3 enable signals need to be provided to module 602. In other words, the enable signal for Cell 0, Cell 1 and Cell 2 need to be set to an active level and corresponding outputs of Cordic module 602 can to be selected using multiplexer 616.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. A system comprising:
   a Cordic module to receive an input signal and to generate an output signal corresponding to a Cordic function of the input signal;
   an estimation module to detect a signal characteristic of the input signal; and
   a control circuit to set an iteration count of the Cordic module as a function of the detected signal characteristic.

2. The system as recited in claim 1, wherein the signal characteristic includes a signal to noise ratio (SNR), wherein the estimation module is configured to generate an SNR signal corresponding to the SNR of the input signal, and wherein the control circuit includes a lookup table module to convert the SNR signal to an iteration signal.

3. The system as recited in claim 2, wherein said Cordic module is a serial Cordic module, and wherein the control circuit is operative to feed the iteration signal to the serial Cordic module to set the iteration count of the serial Cordic module.

4. The system as recited in claim 2, wherein the Cordic module is a parallel Cordic module, and wherein the control circuit is operable to feed a plurality of iteration signals via respective signal lines to the parallel Cordic module to indicate the iteration count of the Cordic module.

5. The system as recited in claim 1, wherein the signal characteristic includes a Receive signal strength indicator (RSSI), a Signal to noise ratio (SNR), or a carrier to noise ratio (CNO).

6. The system as recited in claim 1, wherein the signal characteristic includes a signal to noise ratio (SNR), wherein the control circuit is operative to set an iteration count of the Cordic module as a function of the detected SNR by feeding a signal to the Cordic module to set the iteration count of the Cordic module proportionate to the SNR.

7. The system as recited in claim 1, wherein the signal characteristic includes a signal to noise ratio (SNR), wherein the control circuit is operative to provide a signal to set an iteration count of the Cordic module to a first value corresponding to a first detected SNR, and wherein the control circuit is operative to provide a signal to set an iteration count of the Cordic module to a second value corresponding to a second detected SNR, and wherein the second value is higher than the first value when the second detected SNR is higher than the first SNR.

8. The system as recited in claim 1, wherein the signal characteristic includes a signal to noise ratio (SNR), wherein the estimation module continuously and automatically detects the SNR, and wherein the control circuit continuously and automatically adjusts the iteration count of the Cordic module in response to changes in the SNR.

9. In a Cordic system, a device comprising:
an estimation module to detect a signal characteristic of an input signal; and
a control circuit to set an iteration count of a Cordic module as a function of the detected signal characteristic.

10. The device as recited in claim 9, wherein the signal characteristic comprises a signal to noise ratio (SNR), wherein the estimation module is configured to generate a SNR signal corresponding to the SNR of the input signal, and wherein the control circuit includes a lookup table module to convert the SNR signal to an iteration signal.

11. The device as recited in claim 9, wherein the Cordic module is a serial Cordic module, wherein the control circuit is operative to generate an iteration count signal that is a function of the detected characteristic, and wherein the control circuit is operative to feed the iteration count signal to the Cordic module to set the iteration count of the Cordic module.

12. The device as recited in claim 9, wherein the signal characteristic includes a Receive signal strength indicator (RSSI), a Signal to noise ratio (SNR), or a carrier to noise ratio (CNO).

13. A method comprising dynamically setting iteration counts of a Cordic module of a device as a function of a signal characteristic of an input signal to the Cordic module.

14. The method as recited in claim 13, comprising generating an output signal indicating a value corresponding to a Cordic function of the input signal.

15. The method as recited in claim 13, wherein the signal characteristic comprises a signal to noise ratio (SNR), and wherein the method further comprises generating a SNR signal with a SNR estimation module, the SNR signal corresponding to the SNR of the input signal, and converting using a lookup table module the SNR signal to an iteration count signal.

16. The method as recited in claim 15, comprising feeding the iteration count signal to the Cordic module to set its iteration.

17. The method as recited in claim 13, wherein the signal characteristic comprises a receive signal strength indicator (RSSI), a signal to noise ratio (SNR), or a carrier to noise ratio (CNO), and wherein the iteration counts of the Cordic module is set to a value that is proportional to the signal characteristic.

18. A method as recited in claim 13, further comprising feeding the iteration signal via a clocked register to the Cordic module.

19. The method as recited in claim 13, wherein the signal characteristic comprises a signal to noise ratio (SNR), wherein the method further comprises setting an iteration value of the Cordic module to a first iterative value corresponding to the input signal having a first SNR, setting an iteration value of the Cordic module to a second iterative value corresponding to the input signal having a second SNR, wherein the first iterative value is higher than the second iterative value when the first SNR is higher than the second SNR, and wherein the second iterative value is higher than the first iterative value when the second SNR is higher than the first SNR.

20. The method as recited in claim 13, wherein the signal characteristic comprises a signal to noise ratio (SNR), and wherein the iteration counts of the Cordic module are continually adjusted as the SNR changes.

\* \* \* \* \*